United States Patent [19]
Rabenecker

[11] Patent Number: 6,161,259
[45] Date of Patent: Dec. 19, 2000

[54] MEASURING INSTRUMENT WITH A HOLDER

[75] Inventor: Horst Rabenecker, Stockelsdorf, Germany

[73] Assignee: Dräger Sicherheitstechnik GmbH, Germany

[21] Appl. No.: 09/227,007

[22] Filed: Jan. 7, 1999

[30] Foreign Application Priority Data

Jul. 16, 1998 [DE] Germany .......................... 198 31 893

[51] Int. Cl.[7] .............................. A44B 21/00; A45F 5/02
[52] U.S. Cl. ................. 24/3.11; 24/3.1; 24/3.12
[58] Field of Search ............. 24/3.1, 3.11, 3.12, 24/597; 224/272

[56] References Cited

U.S. PATENT DOCUMENTS

| | | | |
|---|---|---|---|
| 668,088 | 2/1901 | Bruce | 24/3.12 |
| 1,510,822 | 10/1924 | Berndt | 24/3.12 |
| 4,083,481 | 4/1978 | Selinko . | |
| 4,536,925 | 8/1985 | Boothe et al. | 24/3.11 |
| 4,887,753 | 12/1989 | Allen | 24/3.11 |
| 4,956,895 | 9/1990 | Hayasaka | 24/3.11 |
| 5,081,709 | 1/1992 | Benyo et al. . | |
| 5,235,728 | 8/1993 | Nordberg . | |
| 5,361,459 | 11/1994 | Hyvonen et al. . | |
| 5,385,282 | 1/1995 | Chen | 24/3.11 |
| 5,730,348 | 3/1998 | Tien . | |

FOREIGN PATENT DOCUMENTS

| | | | |
|---|---|---|---|
| 0139928 | 5/1985 | European Pat. Off. | 24/3.1 |
| 74 42 901 U | 5/1975 | Germany . | |
| 30 20 095 C2 | 12/1981 | Germany . | |
| 92 09 644 U | 10/1992 | Germany . | |

*Primary Examiner*—Victor N. Sakran
*Attorney, Agent, or Firm*—McGlew & Tuttle, P.C.

[57] ABSTRACT

A mobile measuring instrument that can be worn on the body of persons with a springless holder (1) for detachable fastening to pieces of clothing, with the following features: a plate (8) has a recess (9) with a cutout on one of two shorter sides; a flat slide element has a guide element (12) and is displaceably connected with same to the plate (8) via the cutout (10); both the plate (8) and the slide element (11) are provided with mutually parallel pins (2, 3; 4, 5) on the opposite, longer sides of the plate (8); the pins (2, 3) of the plate (8) are held stationarily rotatably in the housing (6) of the measuring instrument (7); and the pins (4, 5) of the slide element (11), which are arranged in two guides (17) in the housing (6) of the measuring instrument (7), are displaced between a maximum and a minimum distance from the pins (2, 3) of the plate (8), depending on the path of displacement of the slide element (11).

19 Claims, 2 Drawing Sheets

MEASURING INSTRUMENT WITH A HOLDER

FIELD OF THE INVENTION

The present invention pertains to a measuring instrument with a holder for detachable fastening to pieces of clothing.

BACKGROUND OF THE INVENTION

Such measuring instruments are carried, e.g., as compact, mobile gas-measuring instruments with warning function by individual persons on the body or on the clothing. Persons who are exposed to a gaseous hazard carry corresponding instruments in order to be optically and/or acoustically warned when a certain, preset gas concentration is exceeded.

Depending on the clothing and the activity of the user, the measuring instrument must offer the possibility of being able to be fastened to various pieces of clothing simply and securely, but detachably.

A nonpositive fastening with spring clamps is usually performed, wherein the holding force depends on the spring force, the surface finish and the shape of the holder as well as the nature of the pieces of clothing. Depending on the design embodiment of the holder, a relatively strong operating force is needed to open the holder. The spring force of the spring and its reliability of operation may lessen due to aging.

SUMMARY AND OBJECTS OF THE INVENTION

The object of the present invention is to propose a measuring instrument with an improved holder compared with the state of the art, which holder has no spring and can be operated in a simple and reliable manner.

This object is accomplished with a fabric attachment device having a housing and a plate including two pins rotatably connected to the housing. The plate includes a recess and defines a slide cutout. A slide element with guide element means slidably connects to the plate though the cutout. The slide element includes two pins held slidably displaceable in the housing between a maximum and minimum distance from the pins on the plate depending on a path of displacement of the slide element. The fabric attachment device is has strength and attachment characteristics to securely hold a measuring instrument with a holder for detachable fastening to pieces of clothing. One essential advantage of the present invention arises from the fact that the holder of the measuring instrument comprises only two components, which cooperate with one another such that the holder is opened for fastening/removal by a first slide position, while it is closed, i.e., fixed, in the second position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
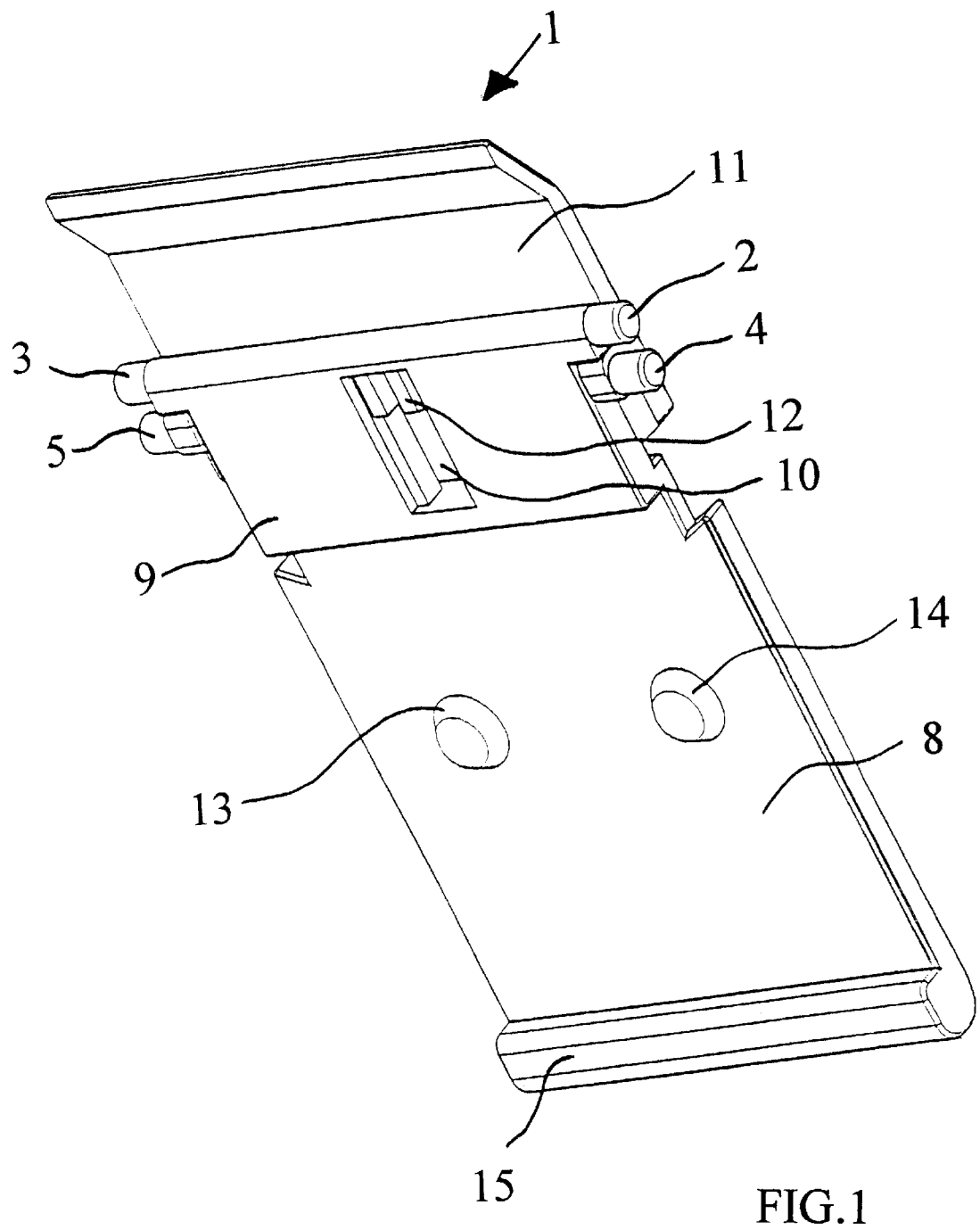
FIG. 1 is a view of a three-dimensional arrangement of the holder 1 in the opened state when viewed from the measuring instrument 7.

Referring to the drawings, FIG. 1 shows a holder 1 according to the present invention, which is rotatably fastened by means of the pins 2, 3 in the housing 6 (FIG. 2) of a measuring instrument 7 and is held movably by means of each of the pins 4, 5 in each guide 17 in the housing 6. The holder 1 comprises two partial elements, namely, a first partial element, comprising an, e.g., rectangular first plate 8 with a recess 9 and a cutout 10 determining the length of the path of displacement, as well as an, e.g., likewise rectangular, flat slide element or second plate 11 with a guide element 12, via which the slide element 11 is connected to the rectangular plate 8 by means of the cutout 10. The guide element 12 may be designed, e.g., in the form of two knobs extending over or through the cutout 10.

One essential advantage of the present invention is due to the fact that the holder 1 comprises only the two parts, which are preferably made of glass fiber-reinforced polyamide according to the injection molding process and that no spring with time-dependent functional properties is needed.

The holder 1 may be moved or rotated with respect to the housing 6 by a displacement (in the direction of the arrow in FIG. 2 which is shown substantially parallel to the plate 8 and slid element 11) of the slide element 11 by a maximum and a minimum distance between the pins 2, 3 of the rectangular plate 8 and the pins 4, 5 of the slide element 11.

The slide element 11 can thus be opened and closed almost without force, and a stable, dimensionally stable locking is achieved due to the circular or arc-shaped contouring of the partial elements and guide 17.

The holder 1 is shaped such that the slide element 11 is bent toward the housing 6 on the side facing away from the rectangular plate 8 and the reinforcement 15 of the rectangular plate 8 is on the shorter side facing away from the slide element 11 by a thickness approximately corresponding to that of the plate 8 in the direction of the housing 6. Due to the bent slide element 11 and the reinforcement 15, sufficiently strong clamping and friction is achieved even in the case of smooth and thin fabrics, and, on the other hand, sufficient space is left between the housing 6 and the holder 1, e.g., for a solid leather belt. A knob strip made of foam rubber, which is buttoned into cutouts 13, 14 of the plate 8, increases the frictional force on smooth fabrics and may be removed to fasten the measuring instrument 7 to thicker fabrics or belts. The holder 1 is pushed together in the closed state, and the slide element 11 with its pins 4, 5 in the slot-like guides 17 is pushed away maximally from the plate 8 in the housing 6 on both sides in the opened position, in which it can be folded down from the housing 6 by a maximum of about 1.0 to 1.5 cm.

The upper part of the slide element 11 now extends with a clearance at a spaced location from the beveled housing 6 and permits the holder 1 to be folded down correspondingly.

The shape of the slide element 11 and the shape of the housing 6, together with the material of the holder 1 form a biasing means which biases the holder 1 into its closed position when the slide element 11 is moved toward the plate 8. The design is such that the far end of the slide element 11 contacts the housing in the close position of the slide element to the plate 8 and force the plate 8 against the housing 6. The housing 6 and the far end of the slide element 6 are spaced from each other when the slide element 11 is extended and the plate 8 is in the closed position to allow rotation of the plate 6 away from the housing 8.

Figure 2:
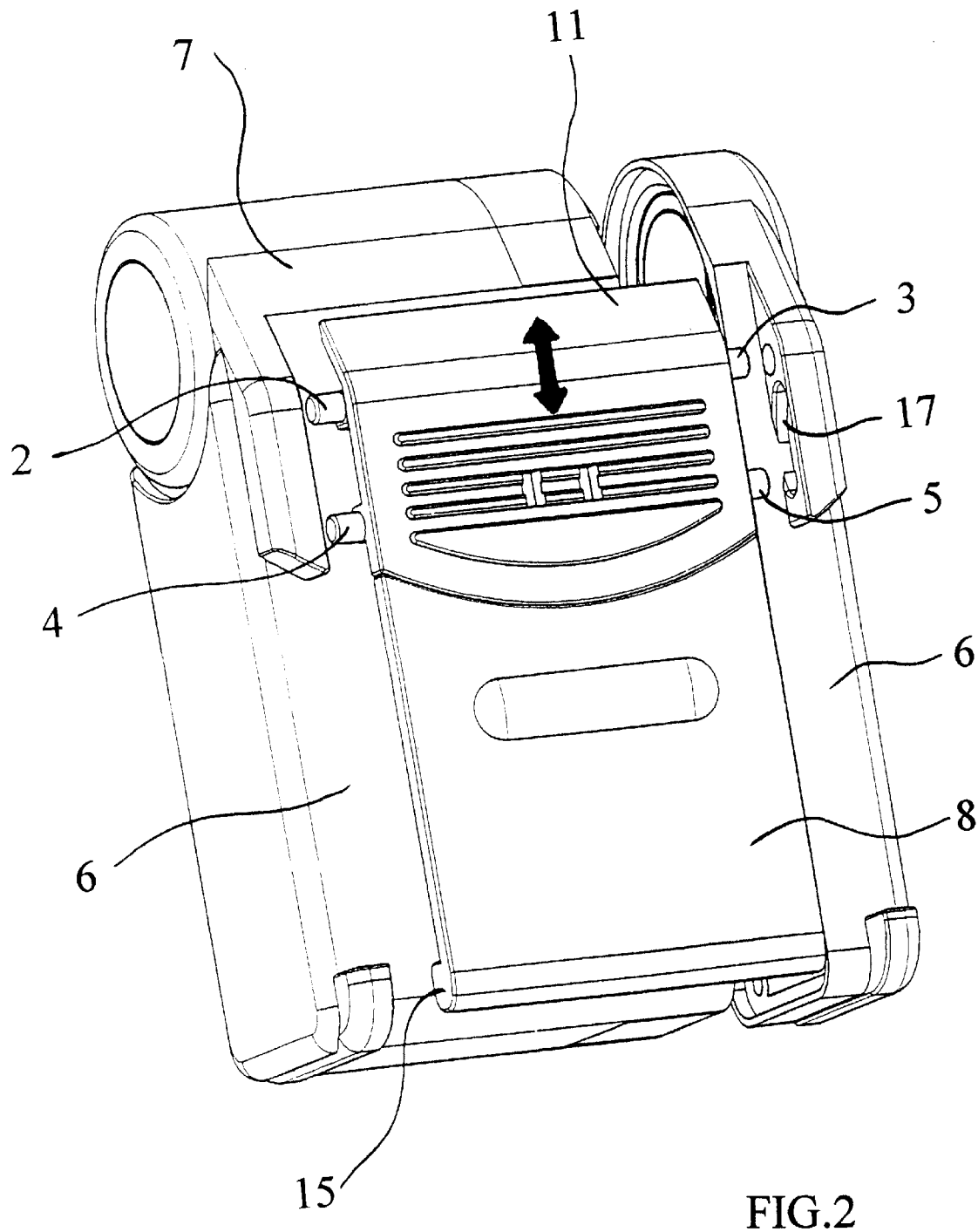
FIG. 2 is a view of the holder according to FIG. 1 at the measuring instrument 7 in the closed state from the outside.

When the slide element 11 in FIG. 2 is moved in the upwards direction of FIG. 2, plate 8 can be pivoted away from the housing 6, rotating on pins 2 and 3. In this position, clothing fits between the plate 8 and housing 6. To fasten the clothing between the plate 8 and the housing 6, slide element 11 in FIG. 2 has to be moved in the downward direction.

While specific embodiments of the invention have been shown and described in detail to illustrate the application of the principles of the invention, it will be understood that the invention may be embodied otherwise without departing from such principles.

What is claimed is:

1. A fabric attachment device comprising:

a housing;

a plate including two pins rotatably connected to said housing, said plate including a recess and defining a slide cutout;

a slide element with guide element for slidably connecting to said plate through said cutout, said slide element including two pins held slidably displaceable in said housing between a maximum and minimum distance from said pins on said plate depending on a path of displacement of said slide element.

2. A device in accordance with claim 1, wherein:

said plate has first and second sides, said first sides are shorter than said second sides, said slide cutout is positioned adjacent one of said first sides, each of said two pins of said plate are positioned on opposite said second sides of said plate, said slide element has first and second sides, said first sides of said slide element are shorter than said second sides of said slide element, each of said two pins of said slide element are positioned on opposite said second sides of said slide element;

said housing includes a measuring instrument.

3. A device in accordance with claim 2, wherein:

said measuring instrument is a mobile gas-measuring instrument with a warning function means.

4. A device in accordance with claim 1, wherein:

said slide element and said plate have adjacent sides when said pins of said plate are at said minimum distance from said pins of said slide element, said adjacent sides are shaped substantially complementarily to create a substantially flush surface over said plate and slide element when said pins are at said minimum distance.

5. A device in accordance with claim 4, wherein:

said adjacent sides are one of circular and arc shaped.

6. A device in accordance with claim 1, wherein:

said plate and said slide element are formed of one of a glass fiber- and carbon fiber-reinforced plastic.

7. A device in accordance with claim 1, wherein:

said plate and said slide element are formed of a glass fiber-reinforced polyamide.

8. A device in accordance with claim 1, wherein:

said slide element includes an end section diametrically opposite to said plate, said end section is bent at an acute angle toward said housing from a plane of a remainder of said slide element for contact with said housing.

9. A device in accordance with claim 1, wherein:

said plate includes a reinforcement positioned diametrically opposite said slide element, said reinforcement having a thickness approximately corresponding to a thickness of said plate in a direction of said housing.

10. A device in accordance with claim 1, wherein:

said plate defines a knob cutout;

a knob strip made of one of silicone rubber and plastic is detachably fastened to said knob cutout.

11. The device in accordance with claim 1, wherein:

said slide element and said plate are slidably connected in a plane substantially parallel to said plate and said slide element.

12. The device in accordance with claim 1, wherein:

said pins of said slide slide in a guide groove of said housing, said guide groove having a shape to lock said plate against said housing.

13. A fabric attachment device comprising:

a housing;

a plate rotatably connected to said housing at one end of said plate between a first position and a second position, another end of said plate being positioned further away from said housing in said first position than in said second position;

a slide element slidably connecting to said plate between a first position and a second position, said slide element having one end extending from said one end of said plate in said second position;

bias means for biasing said plate toward said second position of said plate when said slide element is in said first position.

14. A device in accordance with claim 13, wherein:

said bias means includes said housing and said one end of said slide element having a shape to contact each other in said first position of said slide element and force said plate into said second position of said plate.

15. A device in accordance with claim 14, wherein:

said shape of said housing and said one end of said slide element allowing rotation of said plate between said first and second positions of said plate when said slide element is in said second position.

16. A device in accordance with claim 15, wherein:

said shape of said housing and said one end of said slide element are spaced from each other when said slide element and said plate is in said second position.

17. A device in accordance with claim 14, wherein:

said shape of said housing and said one end of said slide element are in contact with each other when said slide element is in said second position and said plate is in said first position.

18. The device in accordance with claim 13, wherein:

said slide element and said plate are slidably connected in a plane substantially parallel to said plate and said slide element.

19. The device in accordance with claim 13, wherein:

said slide element includes pins slidable in a guide groove of said housing, said guide groove having a shape to lock said plate in said second position.

* * * * *